Patented Sept. 20, 1932

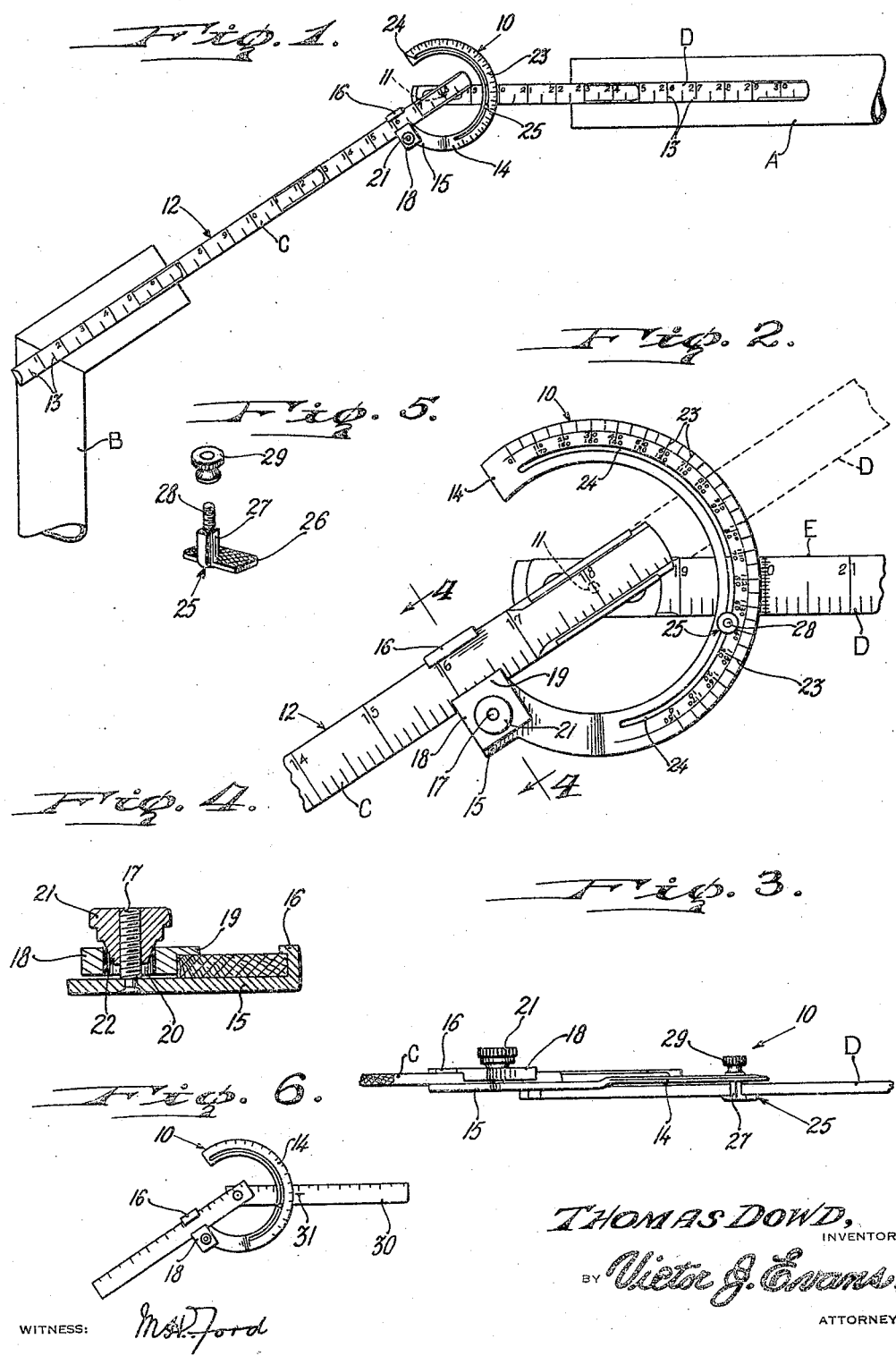

1,878,119

UNITED STATES PATENT OFFICE

THOMAS DOWD, OF NEW YORK, N. Y.

PROTRACTOR

Application filed July 16, 1928. Serial No. 293,062.

This invention relates to improvements in protractors for determining the angularity between the adjacent ends of two pipes to enable the accurate bending and fitting of a pipe section therebetween.

The primary object of the invention resides in a protractor for use upon jointed rules and which may be quickly attached to the rule adjacent any desired joint therein depending upon the space which the jointed sections of the rule must bridge in taking a measurement between two angularly disposed pipes.

Another object is to provide a protractor for measuring rules by which the jointed sections of the rule may be held against movement after the rule sections have been bent to the desired angle, to prevent any miscalculation when bending a part at the angle to conform to the angularity of the adjusted rule sections.

Still another object is to enable the protractor to be used with jointed rules of practically any type so that the user may employ any suitable jointed rule he may have.

A further object is the provision of a protractor which is simple of construction, easy to apply to jointed rules now in use, and by the use of which accurate calculations may be determined.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of a jointed rule with my improved protractor in position thereon and showing the same in use.

Figure 2 is an enlarged detail top plan view of a pair of jointed rule sections with my improved protractor in applied position thereon.

Figure 3 is an edge elevation of the same.

Figure 4 is is a vertical transverse sectional view on the line 4—4 of Figure 2.

Figure 5 is a detail perspective view of the adjusting clamp.

Figure 6 is a plan view of a slightly modified form.

Referring to the drawing by reference characters, the numeral 10 designates my improved protractor in its entirety which is shown in the preferred form as applied to one of the pivoted joints 11 of a carpenter's folding rule 12. The rule 12 is of the usual well-known construction and is graduated to indicate inches and fractions thereof as at 13.

The protractor 10 comprises in this instance an arcuate shape plate 14 which is slightly more than 180° to provide a fixed jaw 15 at one end thereof and which jaw is provided with a flange or lip 16 for overlying one of the edges of the rule sections to which the protractor is attached. Rising from the jaw 15 is a threaded stud 17 over which a movable clamping jaw 18 is applied, the same having a lip 19 for overlying the other edge of the rule section and being disposed opposite the lip 16. The jaw 18 is provided with an opening 20 of a larger diameter than the threaded stud and through which the stud extends, while threaded to and surrounding the stud within the opening 20 is a clamping nut 21. The nut 21 has an annular bevelled or conical surface 22 which extends into the opening 20 when screwed down and engages the walls of the same to wedge therewith to hold said movable jaw 18 in clamping position.

The arcuate plate 14 in this instance is graduated along its outer edge for 180° as at 23 and is provided with an arcuate shape slot 24 which extends slightly beyond the graduations at one end. Movable in the slot is an adjustment clamp 25 which includes a jaw 26 having a square stud 27 rising therefrom and which terminates in a reduced threaded shank 28. The jaw 26 underlies a rule section while the squared stud 27 extends in the slot to prevent turning of the clamp. The threaded shank 28 projects above the top face of the arcuate plate to threadedly receive a clamping nut 29 by which the jaw may be drawn into clamping engagement with the underside of one of the rule sections.

In Figure 1 of the drawing, I have illustrated one use of my invention wherein A designates a horizontal pipe and B the terminating end of an angular pipe to which the pipe A is adapted to be joined. The protractor 10 is mounted on the rule adjacent one of the hinge joints so that the axis of the arcuate shaped plate aligns with the pivotal axis of the rule sections C and D. The radius of the protractor being known, the pivotal axis of the rule sections is set that distance from the edge of jaw 15, thus aligning the respective axes of the arcuate plate and rule; thus enabling practically any jointed rule to be used with the plate 14. The attaching clamp consisting of the jaws 15 and 18, and clamping nut 21, is applied to the rule section C while the arcuate shaped plate 14 overlies the rule section D as clearly shown in Figures 1 and 2. The rule is opened at the joint 11 between rule sections C and D and bent to an angle to bridge the space between the adjacent ends of the pipes A and B, the rule being placed against the pipes as shown in Figure 1. However, before bending the rule sections C and D, a reading is taken with the said rule sections in alignment or as shown in dotted lines in Figure 2. The reading is taken at the point of registration of the upper edge E of the rule section D with the graduations 23 on the arcuate plate. For example, if the edge E registered with 80° when the sections are in co-extended position, and after bending to the angle desired, the upper edge E registered with the graduation reading 135°, the difference between 80° and 135° will represent the deviation or amount of bend of the pipe to be bent and fitted into the space between the pipe A and B. When the rule sections C and D have been swung to adjusted position, the adjusting clamp 25 is tightened to hold the sections against accidental movement.

From the foregoing description taken in connection with the accompanying drawing, it will be seen that the exact measurement of an angular pipe may be determined to fit the spaced terminating ends of a pair of pipes to be connected.

In Figure 6 of the drawing, the construction of the protractor 10 is identical to that hereinbefore described, but in this form I have shown the same applied to a steel draftsman's jointed rule 30 on which an indicating mark 31 is provided for use in connection with the graduations in lieu of the straight edge of one of the rule joint sections as described in the preferred form.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A protractor for attachment to a jointed rule comprising an arcuate shaped graduated plate, clamping means by which said plate may be fixedly attached to one jointed rule section to overlie the next adjacent rule section, adjustable clamping means carried by said plate for holding the rule sections in an adjusted position; said clamping means including means permitting the rule to slide to position with the axes of the rule joint and protractor plate in alignment, and said adjustable clamping means including an underlying jaw portion, whereby the next adjacent rule section may be inserted between said jaw portion and said graduated plate, said graduated plate having a slotted portion and said adjustable clamping means including a portion nonrotatably securable in adjusted position in said slot.

2. A protractor for attachment to a jointed rule comprising, in combination, an arcuate shaped plate having a stationary jaw at one end thereof, means including a movable clamping jaw for co-action with the stationary jaw to fixedly support said arcuate shaped plate upon one rule section, said arcuate shaped plate having an arcuate shaped slot therein, and a clamping device movable along said slot for engagement with the next adjacent jointed rule section for clamping said arcuate plate thereto when in adjusted position, said stationary and movable jaws being adapted to permit the rule to slide to a position with the axes of the rule joint and protractor plate in alignment, and said adjustable clamping means including an underlying jaw portion, whereby the next adjacent rule section may be inserted between said jaw portion and said graduated plate, said graduated plate having a slotted portion and said adjustable clamping means including a portion nonrotatably securable in adjusted position in said slot.

In testimony whereof I have affixed my signature.

THOMAS DOWD.